(No Model.)
A. WOLPERT.
APPARATUS FOR MEASURING THE CARBONIC ACID GAS IN THE ATMOSPHERE.
No. 371,653. Patented Oct. 18, 1887.
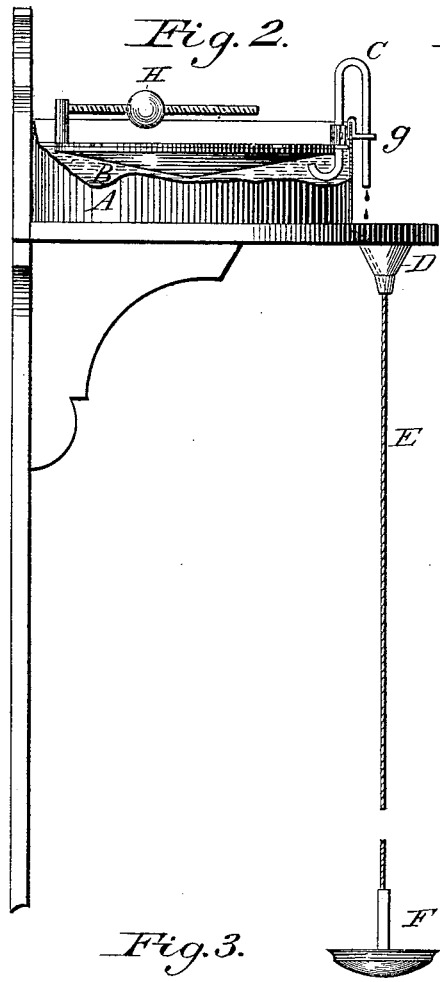
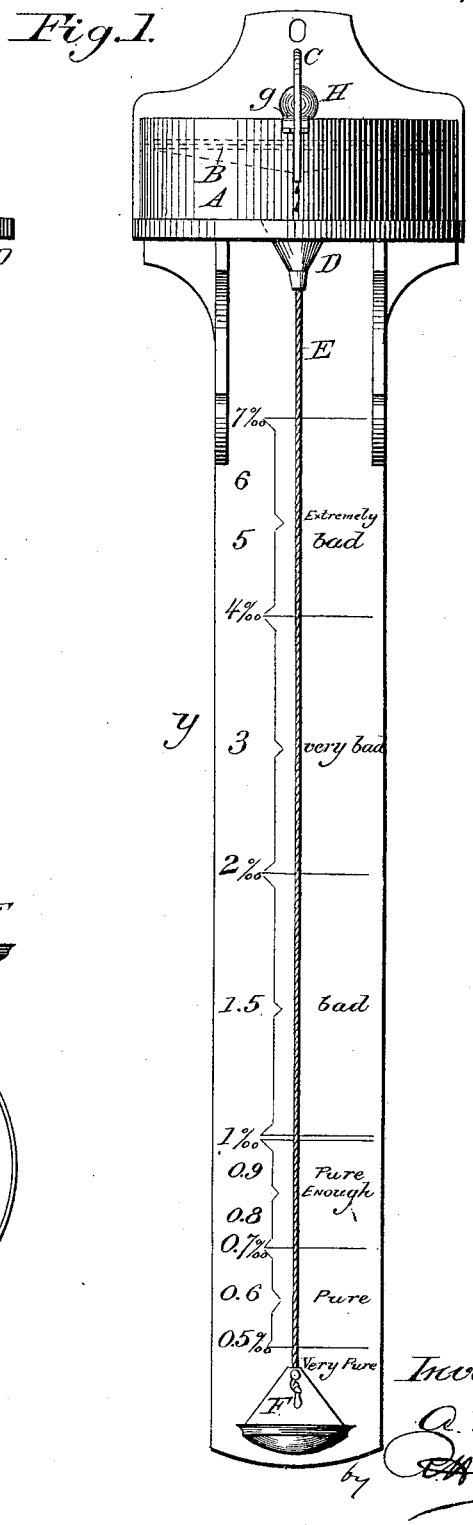
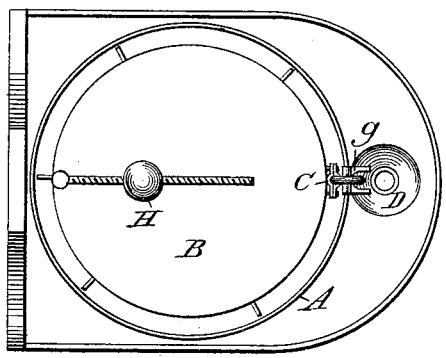
Witnesses:
Inventor:

UNITED STATES PATENT OFFICE.

ADOLF WOLPERT, OF NUREMBERG, BAVARIA, GERMANY.

APPARATUS FOR MEASURING THE CARBONIC-ACID GAS IN THE ATMOSPHERE.

SPECIFICATION forming part of Letters Patent No. 371,653, dated October 18, 1887.

Application filed September 6, 1886. Serial No. 212,865. (No model.)

*To all whom it may concern:*

Be it known that I, ADOLF WOLPERT, a subject of the King of Bavaria, and residing at Nuremberg, Bavaria, Germany, have invented a new and useful Improvement in Detecting and Measuring Apparatus for Carbonic-Acid Gas, of which the following is a specification.

This invention relates to apparatus for showing at any time the percentage of carbonic-acid gas contained in the air. This apparatus is shown in the accompanying drawings, in which—

Figure 1 is a front elevation of the apparatus; Fig. 2, a side view, and Fig. 3 a plan view, thereof.

The working of the apparatus depends upon the fact that the carbonic-acid gas present in the air is, owing to its acid reaction, capable of turning the color of various slightly-alkalized vegetable colors, the rapidity with which it acts being dependent upon the quantity of carbonic-acid gas present in the air.

A small receptacle, A, preferably of cylindrical shape, is arranged on a bracket adapted to be hung against a wall. This receptacle contains a liquid consisting, preferably, of distilled water, in which is dissolved about $0\frac{1}{2}$ per cent. of soda or similar alkali, and to which is added twenty per cent. of an alcoholic solution of phenol phthalein. This liquid is covered and protected from the air by a layer of pure mineral oil or of pure olive-oil prepared by precipitation from an alkaline emulsion. In the liquid is arranged a float, B, made with a conical base to prevent air-bubbles from accumulating underneath. The float is also provided with pins to prevent adhesion to the edge of the receptacle A. To this float B is fixed the tube C, shaped as shown, which acts as a siphon. The weight H, which is adapted to be set at any position along a horizontal rod fixed to the float, counterbalances the siphon C. The latter is of very small bore, and the liquid from the receptacle A drops therefrom at intervals into the funnel D, to which is attached a depending cord, E, of suitable length, ending in a small pan or basin, F. The liquid flows gradually down the cord E by capillary attraction, and is thus exposed to the air. The carbonic-acid gas in the latter will then commence to act on the liquid until a sufficient quantity of the acid has been absorbed by the liquid to neutralize the small amount of alkali already present therein. When this point is reached, the further absorption of acid turns the color of the liquid. Thus, as is well known in the case of phenol phthalein, which is turned red by an alkali, the color is bleached by an excess of acid. The change takes place more or less rapidly according to the greater or less amount of acid present in the air, and since the solution is fed substantially continuously above and passes down the cord at an even rate, so that it passes over equal lengths of cord in equal spaces of time, the distance between the point where the change is effected and the upper end of the cord will be longer or shorter according to the greater or less purity of the atmosphere with respect to the carbonic acid contained therein.

The quantity of carbonic acid present in the air is so comparatively small that an appreciable amount of time is required for its effects to be visible on the solution, since it has first to overcome the alkaline reaction of the soda present in the solution. As the cord is continually fed with the new solution, the soda in the latter is always re-enforcing that solution that may happen to remain on the upper part of the cord, so that for a certain length from the top the solution will remain of its original color. The length and quality of the cord will prevent the solution from flowing down so quickly that the carbonic acid has not time to show any effect on it. It is known that as respects solutions of certain vegetable coloring-matters, especially of litmus, on adding an alkali they turn blue, and that acid may be added up to the point at which the alkali is almost neutralized without changing the color; but when the acid commences to predominate the solution becomes red. When litmus is used in the apparatus, the liquid originally blue remains blue until the carbonic acid dissolved by the solution from the air exceeds the small percentage of alkali already in the solution, when the solution turns red. There is no deposition of solid matter in the fibers of the cord; but the red solution continues to filter down the cord, making place for fresh solution, which is reddened in its turn.

It is immaterial whether the solution be originally red or white or other color, provided it be visibly changed in color by the carbonic acid.

A scale arranged behind the cord may be marked with the corresponding percentage of carbonic acid, or may also indicate in words the state of the air in relation thereto.

The used liquid is received in the pan F, which should be emptied daily.

What I claim is—

1. In apparatus for testing air for carbonic acid, a receptacle, A, closed to the air and containing a slightly-alkaline solution of an organic coloring adapted to be changed in color by an acid, in combination with cord E, to which the solution may be fed and down which it is adapted to flow, substantially as and for the purpose set forth.

2. The apparatus consisting of receptacle A, float B, siphon C, funnel D, cord E, pan F, and scale I, all combined substantially as described and illustrated, and for the purpose set forth.

In testimony whereof I have signed this specification in the presence of two subscribing witnesses.

ADOLF WOLPERT.

Witnesses:
CONRAD STANDT,
MORITZ SACHS.